United States Patent Office 3,363,171
Patented Jan. 9, 1968

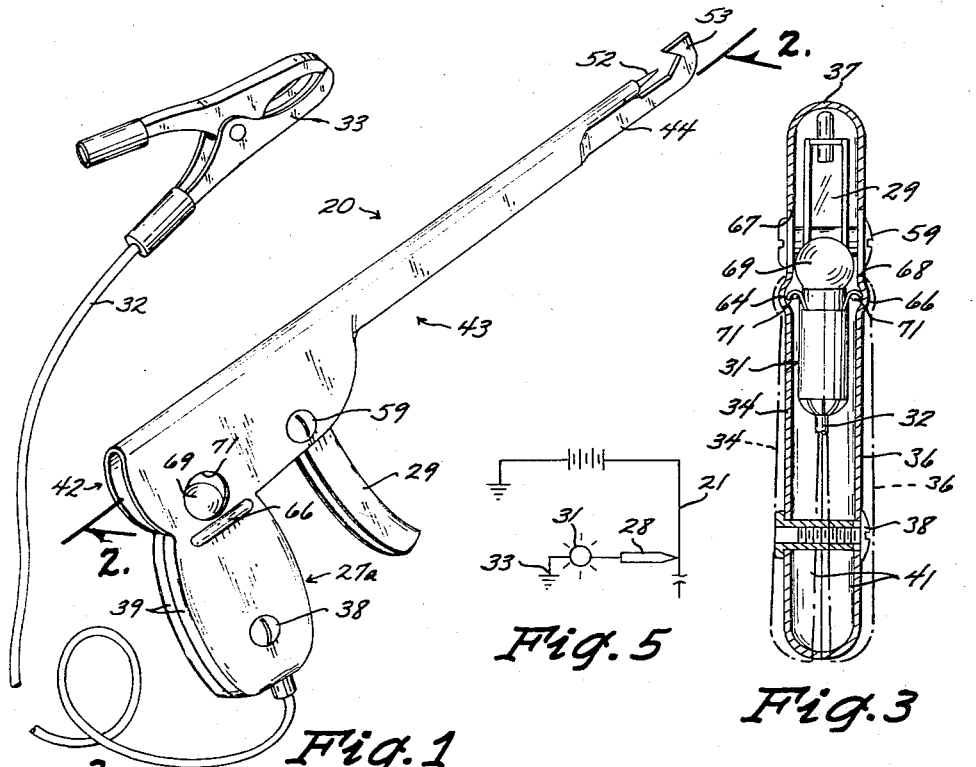
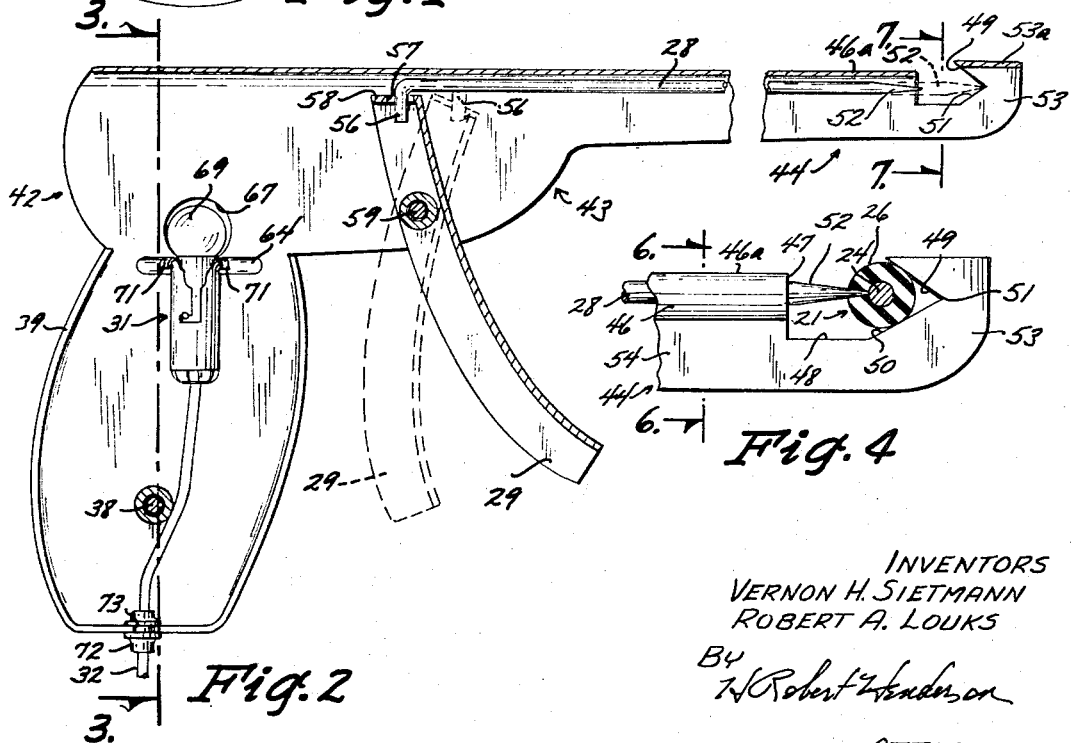
Fig. 1  Fig. 5  Fig. 3  Fig. 2  Fig. 4
Jan. 9, 1968 — V. H. SIETMANN ET AL — 3,363,171
ELECTRICAL CIRCUIT TESTER WITH INSULATION PIERCING PROBE MEANS
Filed June 17, 1966 — 2 Sheets-Sheet 1
INVENTORS
VERNON H. SIETMANN
ROBERT A. LOUKS
ATTORNEY

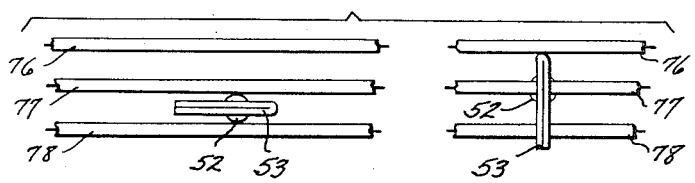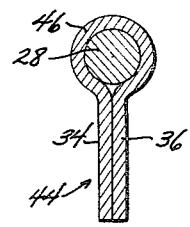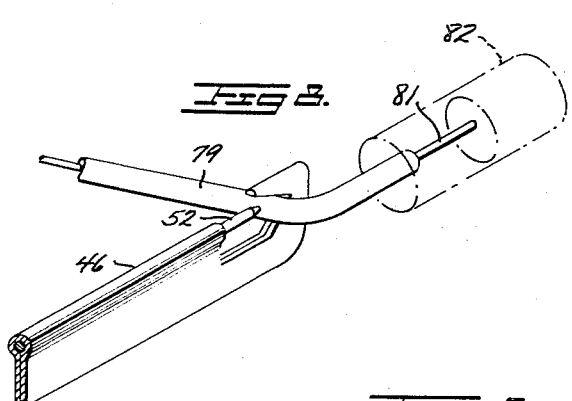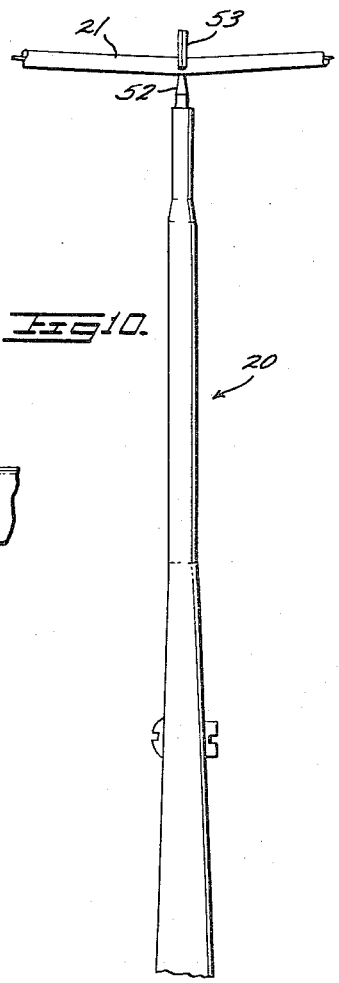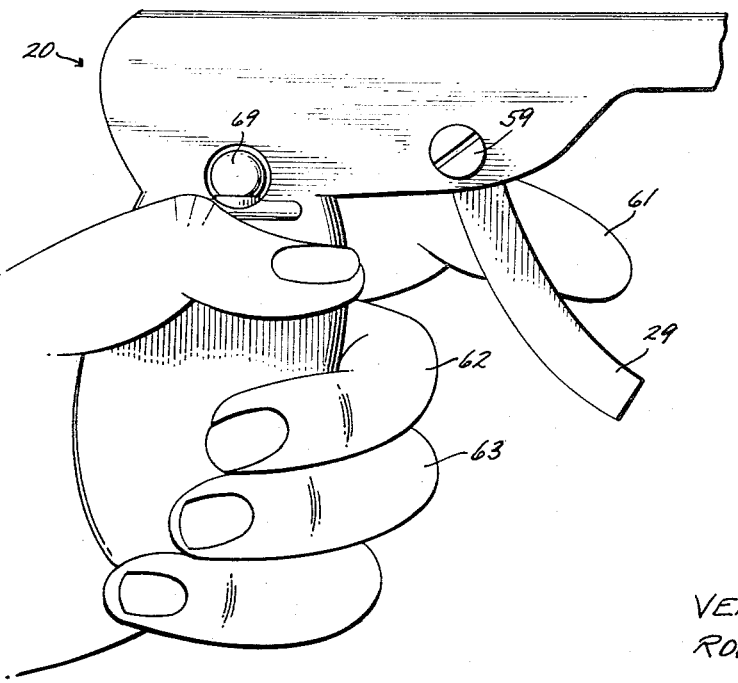

3,363,171
ELECTRICAL CIRCUIT TESTER WITH INSULATION PIERCING PROBE MEANS
Vernon H. Sietmann, Laurel, Iowa 50141, and Robert A. Louks, Gilman, Iowa 50106
Filed June 17, 1966, Ser. No. 558,488
5 Claims. (Cl. 324—51)

ABSTRACT OF THE DISCLOSURE

This invention relates to a manually operated pistol-type tool for testing a low voltage circuit for the purpose of locating where a break or short has occurred in the circuit for repair purposes. By pressing a trigger by the finger in the same manner as pulling a trigger of a gun, a conductive probe at the muzzle end of the tool which has ensnared the conduit being tested is driven through the insulation and into contact with the wire therein. The probe is then grounded through the body of the tool and a light bulb connected therein such that if the circuit at that point is closed, the bulb will be illuminated.

---

In devices of this general nature it is usually necessary to remove the insulation from an electrical conductor for the purpose of making contact therewith. This is not only a time consuming operation but often results in damage to the conductor, generally in the form of a wire, and requires the service of a highly skilled person to repair the damage such that the original appearance is preserved.

It is, therefore, an object of this invention to provide a new and useful test probe which obviates such insulation removal and the subsequent repair, and which furthermore facilitates locating a break in any electric circuit and visually indicates the break.

Another object of this invention is to provide a test probe having a shape which adapts its being held by the hand of the user in a natural and comfortable manner.

Yet another object of the invention is the provision of a test probe having a shape which adapts its being held by the hand of the user such as to provide an exact and precise manipulation of the probe end thereof to locate and grasp a particular wire to be tested. Putting it another way, the particular shape of the test probe device enables the user to actually draw a bead on the wire to be tested preliminary to and then concurrent with grasping the wire.

Still another object of this invention is the provision of a test probe wherein an insulated wire can be pierced to place a piercing probe in contact with the wire therein, the probe can be left unattended whereby both hands of the user are free and with the contact retained, and wherein the probe can then be withdrawn, all three consecutive steps provided without the presence of a spring or the like as a part of the test probe device.

Another object of this invention is the provision of a test probe device the construction of which is most simple and practical, the servicing of which is extremely easy, the replacement of any part of which can be done in but a few minutes, and yet wherein the device is effective and fool-proof in its service, providing a quality instrument.

Still another object of this invention is the provision of a test probe device providing a light readily visible when a current break is located, and which light has a simple but effective shock-absorbing mounting within the device to ensure long life thereof.

It is another object of this invention to provide a test probe device having a flattened probing end which facilitates inserting the probing end into and between a plurality of wires for searching out and grasping a particular wire; and wherein further the probing end is hooked with a projection thereof which facilitates grasping the wire, it being assumed the wire is relatively inaccessible; and still further wherein the probing end ensures a direct piercing of a wire insulation such as to obviate any distortion or slipping of the insulation which would prevent either a positive contact or permit damage of the insulation.

Another object of this invention is the provision of a test probe device wherein by combination with a short piece of wire or other conductive material, the effective length of the probe and a miniaturization thereof is provided.

It is still another object of this invention to provide an extremely simple, practical and economical test probe device capable of attaining the objectives listed hereinbefore.

These objects, and other features and advantages of this invention will become readily apparent upon reference to the following description when taken into account with the accompanying drawings, wherein:

FIG. 1 is a perspective view of a preferred embodiment of this invention;

FIG. 2 is a full scale longitudinal sectional view thereof taken along the line 2—2 in FIG. 1, and showing alternate positions by the use of full and dotted lines;

FIG. 3 is a sectional view taken along the line 3—3 in FIG. 2, and showing alternate positions by the use of full and dotted lines;

FIG. 4 is an enlarged detail view of FIG. 2, showing an insulated wire held by the probe end;

FIG. 5 is a schematic of the electric wiring of the device when in use;

FIG. 6 is an enlarged sectional view taken along the line 6—6 in FIG. 4;

FIG. 7 is a two-part perspective view showing the location and clamping of a wire with that part of the test probe device taken along the line 7—7 in FIG. 2;

FIG. 8 is a perspective view showing the device used in combination with a short piece of wire;

FIG. 9 is a side elevational view of the device showing the finger manipulation of the trigger; and FIG. 10 is a reduced view showing the device suspended unattended from a wire being tested.

Referring now to the drawings and particularly FIG. 1, the test probe device of this invention is indicated generally at 20 and is used primarily for engaging and piercing an electric, insulated wire 21 (FIG. 4) in order to locate a break 22 (FIG. 5) in a low voltage circuit 23. The wire 21 is of a conventional manufacture, having the actual current conductor 24 covered by a protective insulation 26. As mentioned hereinbefore, the primary function of the device 20 is to pierce the insulation 26 and conductively engage the conductor 24 without damaging the insulation 26.

The test probe device 20 comprises generally a case 27 holding a piercing rod 28 (FIG. 2) reciprocally mounted therein by a trigger 29 pivoted to the case 27, and a lamp 31 (FIG. 3) resiliently supported within the case 27 which is connected by an electrically conductive cord 32 to a conventional clip 33 for grounding the lamp 31.

Specifically, the case 27 comprises a stamping of two identical halves 34 and 36 (FIG. 3) closed together at the longitudinal center 37 and held together by a fastener 38. It may readily be seen that the case 27 has a pistol grip formation, the palm grip portion 27a (FIG. 1) being closed by pairs of inwardly turned flanges 39 (rear) and 41 (front, FIG. 3). The upper rear 42 (FIGS. 1 and 2) of the case 27 is thus open, as is the under portion 43 (FIG. 2) beneath the curved top 37. The portion 43 is flattened out at 44 (FIGS. 1 and 4), both halves being completely contiguous (FIG. 6) except for a sleeve 46 formed for slidably receiving the piercing rod 28.

The flattened portion 44 has a cavity formed therein defined by adjoining vertical and horizontal walls 47 and 48 (FIG. 4), and converging sidewalls 49 and 50, their apex 51 longitudinally, axially aligned with the longitudinal center of the sleeve 46 and of the probe 28. It is clearly seen in FIG. 4 that the sidewalls 47 and 48, extending tangentially in a diverging manner the same direction as the pointed end 52 of the probe 28, provide a trap for the wire 21 to be pierced.

Furthermore, due to the width of the outer end 53 (FIG. 4) being greater than the width of the sleeve end 54, the upper portion 53a extends above, so to speak, the upper surface 46a of the sleeve 46, in the nature of a sight on a gun barrel. The protruding portion 53a serves further as a catch for the wire 21. Thus, where the wire 21 is inaccessible, by projecting the forward end of the device 20 beyond the semi-stationary wire 21, then withdrawing the device 20 while retaining the wire 21 in contacting engagement with the upper surface of the case top 37 and the sleeve upper surface 46a, upon the cavitational area being drawn beneath the wire 21, the projection 53a will tend to "catch" the wire 21 on the upper sidewall 47.

The wire 21 (FIG. 4) is then nested by the sidewalls 49 and 50 in their apex 51, and held for dead center piercing by the probe end 52. Slipping and rotation of the wire 21 is thereby prevented, obviating damage to the insulation 26.

The rod 28, hereinafter called a probe, is elongated, circular in cross section, having the pointed forward end 52 (FIG. 2) and a rear end 56 bent at right angles to the remainder of the probe 28. The cross-sectional area of the probe 28 is such that it fits loosely within the top 37, and has a snug but freely slidable fit through the sleeve 46.

The probe rear end 56 (FIG. 2) depends through an opening 57 formed in the upper closed end 58 of the trigger 29. The remainder of the trigger 29 is U-shaped, having a slight curvature as illustrated, and pivoted to the case 27 by a fastener 59. In the forward, full line position of FIG. 2, the trigger 29 holds the probe 28 in a retracted position, the pointed end 52 barely protruding, if at all, from the sleeve 46. Then, when the trigger 29 is drawn toward the case palm portion 27a the probe 28 is forced forwardly toward the portion 53 and adapted for piercing the wire 21.

Referring to FIG. 9, it will be observed that the trigger 29 is so arranged, relative to the remainder of the case 27, such that it is drawn rearwardly by the index finger 61 of the average hand, and whereby it can be returned to its forwardmost full line position by the second, and third if necessary, fingers 62 and 63. The pistol-grip and trigger construction of the device 20 thus obviates the necessity for a spring to bias the probe 28 one way or another. Furthermore, due to the structure of the depending end 56 of the probe 28 extended through the opening 57 in the closed upper trigger end 58, a binding occurs therebetween as the trigger 29 moves between the full and dotted line positions of FIG. 2, such that when the probe 28 has pierced the wire 21, the probe 28 retains its position until removed. Thus, the device 20 may be left unattended as shown in FIG. 10, leaving both hands of the user free for other use.

Referring to FIGS. 2 and 3, it may be seen that to receive the lamp 31, each case halve 34 and 36 has an outwardly projecting lineal depression 64 and 66, formed therein, and with cut-outs 67 and 68 formed to expose the bulb 69 to the naked eye. The lamp 31 has a casing with four flexible fingers 71 defining in plan view a rectangle, whereby a snug, resilient mounting between the case 27 and the lamp 31 is provide of a shock-absorbing nature. The cord 32 from the lamp base passes through an insulating grommet 72 adapted to be secured in a small opening 73 (FIG. 2) at the base of the portion 27a, and leads to the conventional dip 33. Obviously, upon completing a circuit with the device 20, the bulb 69 will be illuminated.

Referring to FIG. 3, it may readily be seen that the lamp 31 may be replaced by merely removing the fastener 38, spreading the stamped halves 34 and 36, as shown in dotted lines in FIG. 3, pulling the lamp 31, cord 32 and grommet 72 out. These latter units are then replaceable, the lamp fingers 71 fitting the in the depression 64 and 66, whereupon the fastener 38 is replaced, securing the unit together.

The trigger 29 and probe 28 may also be readily removed by withdrawing the fastener 59, pulling the trigger 29 downwardly away from the probe end 56, and dropping the probe 28 out through the open, upper rear end 42 (FIG. 1) of the case. To replace these parts merely calls for a reversal of the steps just recited.

Referring to FIG. 7, the effectiveness of the flattened front end portion 53 is illustrated. In many instances, a plurality of closely interwoven wires 76, 77, and 78 are encountered, wherein only one wire 77 is desired to be checked. Due to the extremely flat nature of the front 53 of the device 20, that end may be inserted between the wire 77 and 78, for example, without disturbing them, then rotated 90° for clamping and piercing the desired wire 77. Another feature of the device 20 is shown in FIG. 8. By clamping and piercing a short piece of wire 79, and thus having electrical conductive contact with the conductor 81 thereof, the conductor 81 may be used as an extension of the device 20, enabling access thereof to otherwise inaccessible areas for touch contact testing, within a deep socket 82 for example.

When contact with a current conducting wire or other object is made, the current passes through the probe 28, the trigger 29, and the case 27 to the lamp 31, and from thence through the cord 32 and clip 33 to ground.

In summation, an extremely simple, practical and easily serviced test light probe device has been described hereinbefore which provides an excellent hand tool for searching, finding, clamping and electrically testing a wire without damaging the insulation thereof, and which provides a natural and comfortable grip for the user, enabling a more sensitive feel for the usually inaccessible wires. These features are joined by others such as eliminating the spring found in other devices of this type, providing a quick and fool proof method of locating and catching a wire, and permitting the device to be left unattended while in use. The sleeve and end projection function as a barrel and sight in aiding the locating of the wire to be tested.

Although a preferred embodiment of this invention has been described hereinbefore, it is to be remembered that various modifications and alternate constructions may be made thereto without departing from the true spirit and scope of the invention as defined in the appended claims.

We claim:

1. A short and break locator and test device for an electric wire positioned in place, the wire having a conductor covered by an insulation and carrying a low voltage current, comprising:

electrically conductive case means adapted to be held in the hand;

cord means connected to said case means for connecting said case means with the source of electric current for the wire;

means connected to said case means for indicating the existence of current passing therethrough;

finger movable electrically conductive probe means connected to said case means and movable relative to said case means from a first position disengaged from the wire, to a second position exposed from said case means piercing said insulation and contacting the conductor; and said case means having a cavity-forming portion at an end thereof where said probe means is exposed for snugly holding the wire with the conductor axially aligned with and extended at right angles to said probe means movement.

2. A test device as defined in claim 1, and further wherein said case means is formed in the shape of a pistol, having a palm-grip portion and a barrel portion, with said finger movable means including a finger engageable trigger pivotally connected to said case means, and an elongated probe, having a forward, exposed pointed end, pivotally connected to said trigger and reciprocally movable through said barrel portion.

3. A test device as defined in claim 2 and further wherein said case means is comprised of a single stamping bent along its longitudinal axis to form a pair of halves fastened together, said source connected means including a lamp resiliently, loosely held within said stamping and removable upon release and slight separation of said halves.

4. A test device as defined in claim 3, and further wherein said trigger is retractable by an index finger to an operative position, and returnable to an inoperative position by another finger placed between said trigger and said palm-grip portion.

5. A test device as defined in claim 4, and further wherein said probe is self-held in its second position, returnable only to its first position by movement of said trigger to said inoperative position, said device thereby capable of being left unattended but with said probe and conductor engaged.

References Cited

UNITED STATES PATENTS

| | | | |
|---|---|---|---|
| 467,891 | 1/1892 | Neu | 339—97 |
| 1,650,779 | 11/1927 | Williams | 324—51 X |
| 2,212,307 | 8/1940 | Smida | 324—51 |
| 2,509,653 | 5/1950 | Show | 324—51 |
| 2,529,270 | 11/1950 | Webster | 324—51 X |
| 2,639,318 | 5/1953 | Des Roches | 324—51 |

FOREIGN PATENTS

| | | |
|---|---|---|
| 829,353 | 6/1938 | France. |

OTHER REFERENCES

"Dual Purpose Probe," H. T. Johnston, Jr., IBM Technical Disclosure Bulletin, vol. 5, No. 5, October 1962.

RUDOLPH V. ROLINEC, *Primary Examiner.*

WALTER L. CARLSON, *Examiner.*

G. R. STRECKER, *Assistant Examiner.*